(12) United States Patent
Sawamoto et al.

(10) Patent No.: US 7,206,686 B2
(45) Date of Patent: Apr. 17, 2007

(54) SYSTEM AND METHOD FOR DETECTING AN OBJECT AHEAD OF A VEHICLE AND CONTROLLING THE VEHICLE IN RESPONSE TO THE DETECTED OBJECT

(75) Inventors: Kiichiro Sawamoto, Saitama (JP); Shigeru Inoue, Saitama (JP); Hiroshi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 10/975,836

(22) Filed: Oct. 27, 2004

(65) Prior Publication Data
US 2005/0171675 A1 Aug. 4, 2005

(30) Foreign Application Priority Data
Nov. 10, 2003 (JP) .............................. 2003-379930

(51) Int. Cl.
*B60T 7/12* (2006.01)
(52) U.S. Cl. .................. 701/96; 701/93; 701/301; 342/455; 340/435; 340/436; 340/903; 180/170; 180/179
(58) Field of Classification Search ................ 701/93, 701/96, 117, 119, 300, 301; 340/435, 436; 342/455
See application file for complete search history.

(56) References Cited

U.S. PATENT DOCUMENTS

| | | | |
|---|---|---|---|
| 5,521,579 A * | 5/1996 | Bernhard | 340/438 |
| 5,806,019 A * | 9/1998 | Ishiyama | 701/300 |
| 6,067,031 A * | 5/2000 | Janky et al. | 340/903 |
| 6,085,151 A * | 7/2000 | Farmer et al. | 701/301 |
| 6,268,804 B1 * | 7/2001 | Janky et al. | 340/903 |
| 6,292,719 B1 * | 9/2001 | Seto et al. | 701/1 |
| 6,405,132 B1 * | 6/2002 | Breed et al. | 701/301 |
| 6,437,688 B1 * | 8/2002 | Kobayashi | 340/435 |
| 6,526,352 B1 * | 2/2003 | Breed et al. | 701/213 |
| 6,684,149 B2 * | 1/2004 | Nakamura et al. | 701/96 |
| 6,720,920 B2 * | 4/2004 | Breed et al. | 342/386 |
| 6,724,300 B2 * | 4/2004 | Miyakoshi et al. | 340/435 |
| 6,768,944 B2 * | 7/2004 | Breed et al. | 701/301 |
| 6,995,663 B2 * | 2/2006 | Geisler et al. | 340/439 |
| 6,998,972 B2 * | 2/2006 | Geisler et al. | 340/439 |

(Continued)

FOREIGN PATENT DOCUMENTS

DE 60003872 E * 8/2003

(Continued)

*Primary Examiner*—Cuong Nguyen
(74) *Attorney, Agent, or Firm*—O'Melveny & Myers LLP

(57) ABSTRACT

When a deceleration intention detector detects that an occupant has apprehension about a condition ahead of his own vehicle and attempts to decelerate the own vehicle, a detection area setter enlarges a detection area in which a control object is detected, upon a command from a control object determinator. Therefore, a new control object such as a cutting-in vehicle can be more reliably detected in accordance with an increase in an amount of attention which the occupant pays to the condition ahead of the own vehicle. As a result, a vehicle controller changes a vehicle control content of the own vehicle, thereby performing an appropriate vehicle control with respect to the newly detected control object to eliminate a sense of discomfort of the occupant.

21 Claims, 5 Drawing Sheets

U.S. PATENT DOCUMENTS

| | | | |
|---|---|---|---|
| 7,103,478 B2 * | 9/2006 | Sawamoto | 701/301 |
| 2002/0198632 A1 * | 12/2002 | Breed et al. | 701/1 |
| 2003/0045991 A1 * | 3/2003 | Isogai et al. | 701/96 |
| 2003/0191568 A1 * | 10/2003 | Breed | 701/36 |
| 2003/0209893 A1 * | 11/2003 | Breed et al. | 280/735 |
| 2004/0088205 A1 * | 5/2004 | Geisler et al. | 705/7 |
| 2004/0113799 A1 * | 6/2004 | Geisler et al. | 340/576 |
| 2004/0117090 A1 * | 6/2004 | Samukawa et al. | 701/45 |
| 2005/0090950 A1 * | 4/2005 | Sawamoto et al. | 701/23 |
| 2005/0102089 A1 * | 5/2005 | Linden | 701/96 |
| 2005/0171675 A1 * | 8/2005 | Sawamoto et al. | 701/96 |
| 2005/0209762 A1 * | 9/2005 | Lu et al. | 701/70 |
| 2005/0216171 A1 * | 9/2005 | Heinrichs-Bartscher | 701/96 |
| 2006/0089802 A1 * | 4/2006 | Sawamoto | 701/301 |

FOREIGN PATENT DOCUMENTS

| | | | |
|---|---|---|---|
| DE | 1004040532 A1 * | 3/2005 | |
| DE | 1004052914 A1 * | 8/2005 | |
| EP | 1052610 B1 * | 7/2003 | |
| JP | 5-174296 | 7/1993 | |
| JP | 2005100336 A * | 4/2005 | |
| JP | 2005115816 A * | 4/2005 | |
| JP | 3831171 B2 * | 10/2006 | |

* cited by examiner

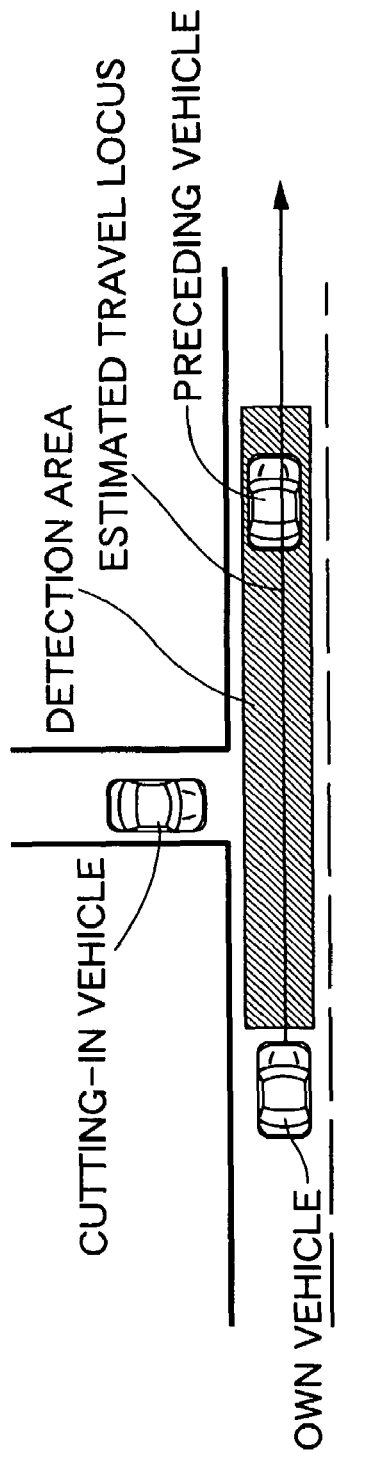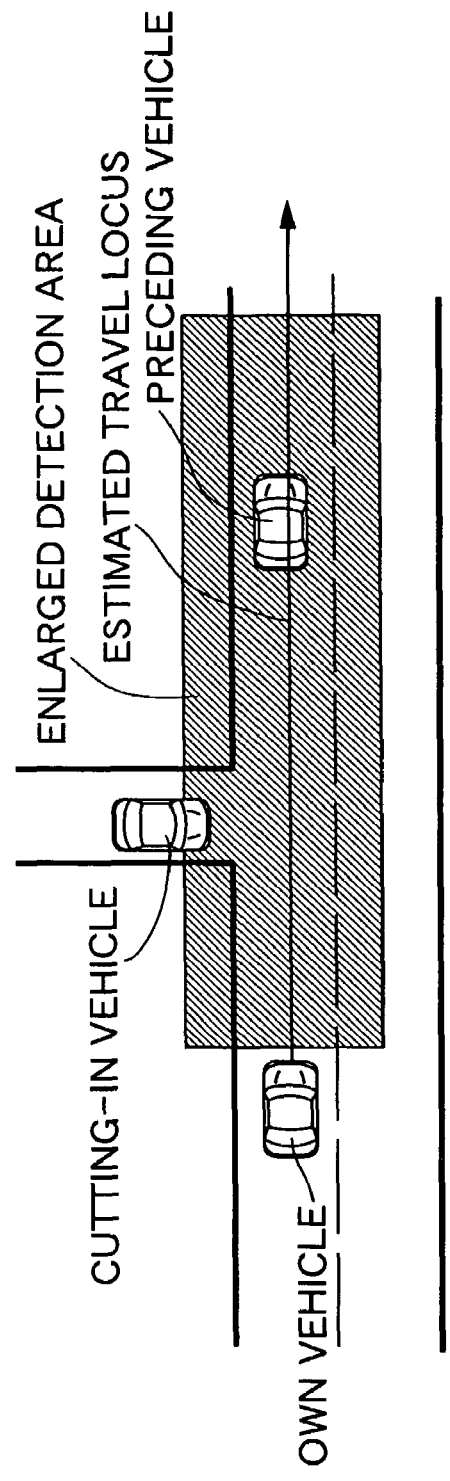

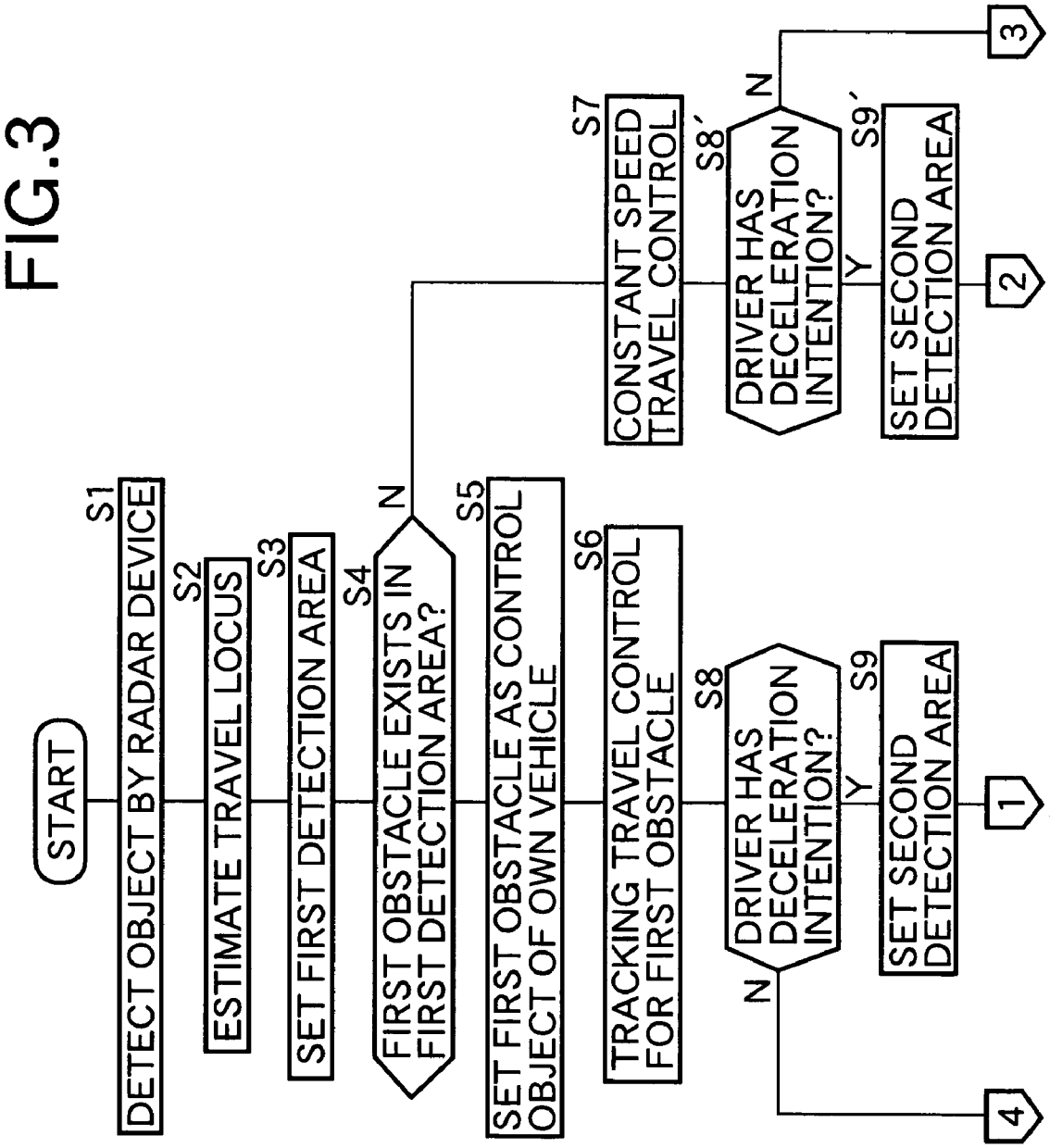

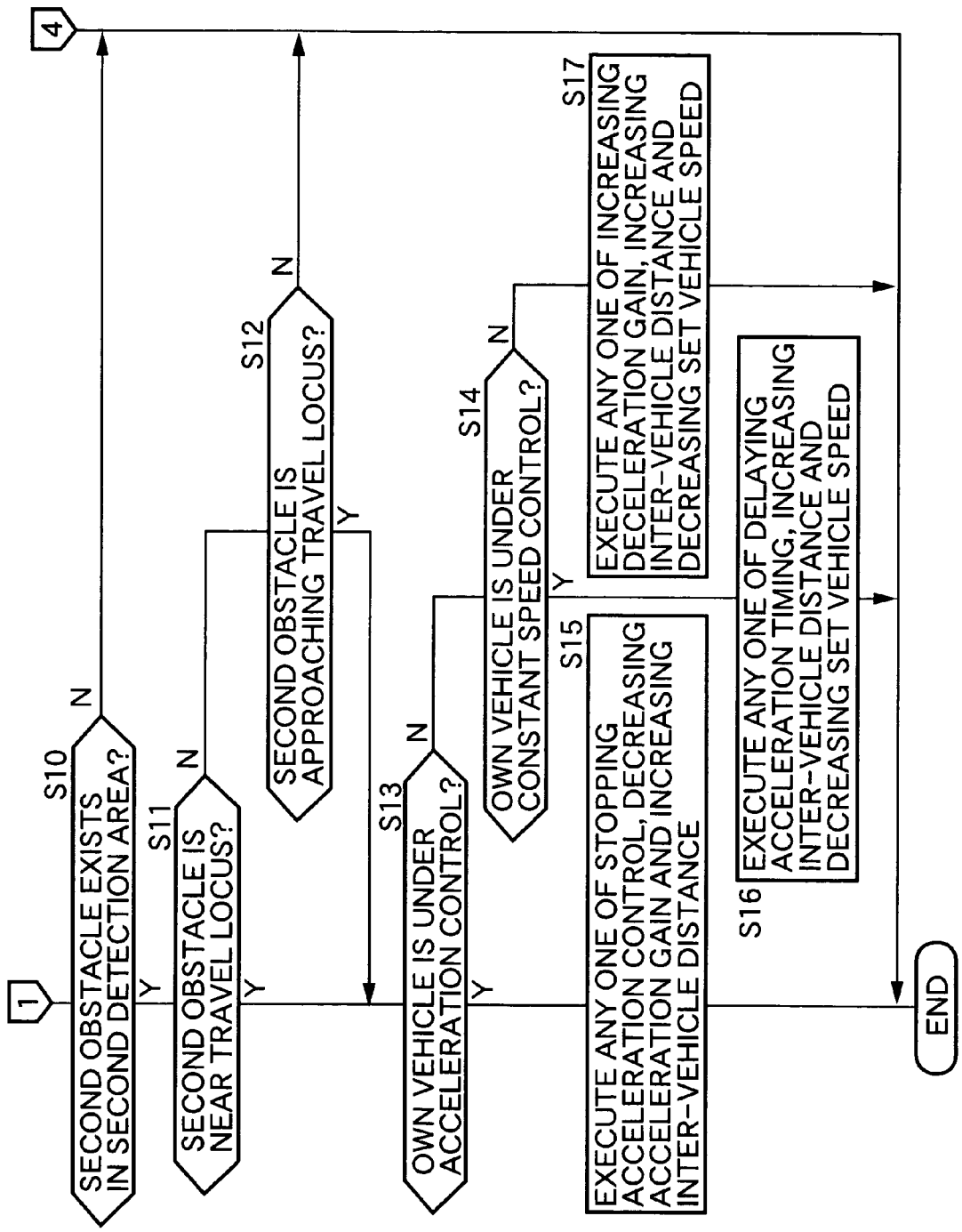

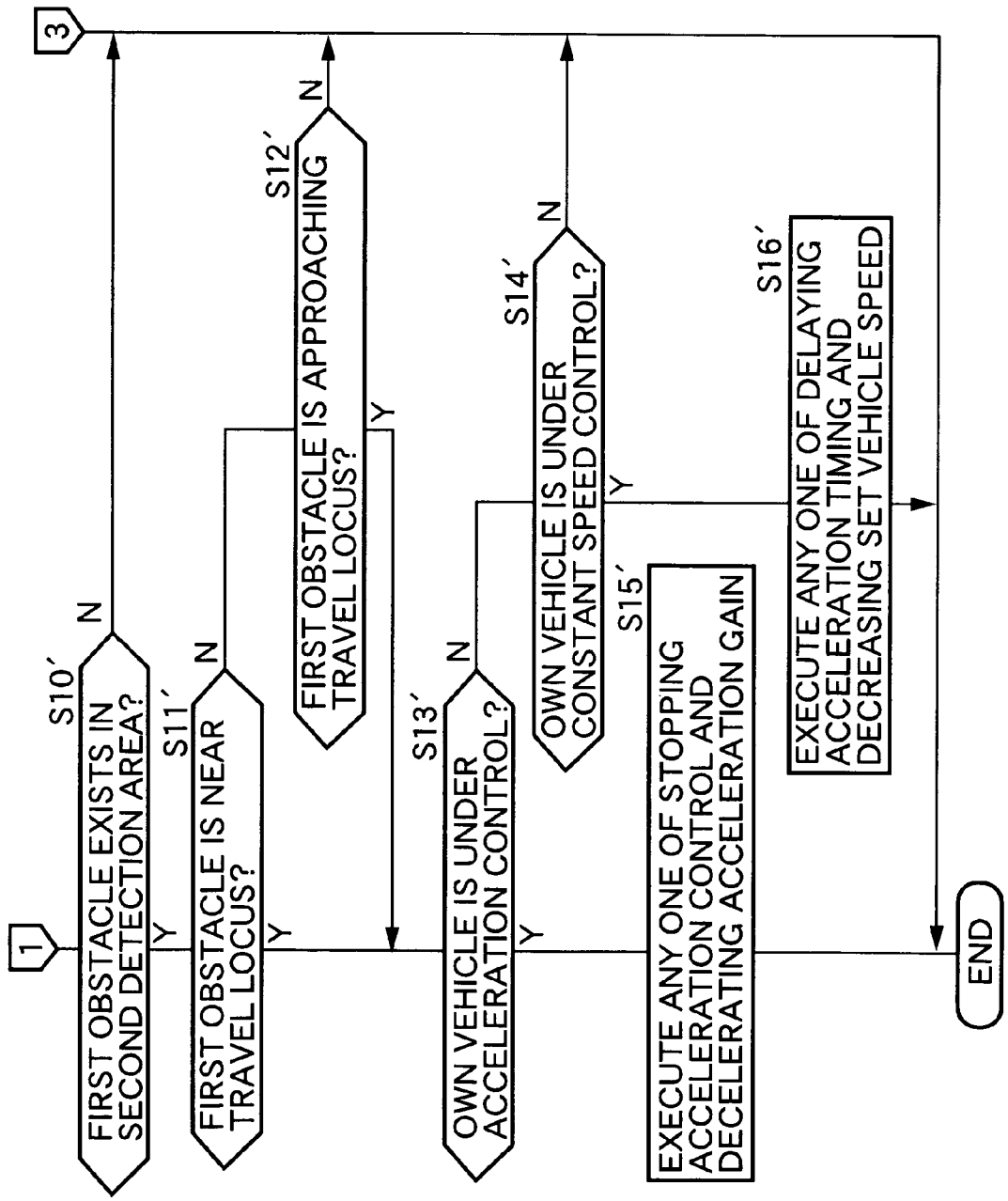

SYSTEM AND METHOD FOR DETECTING AN OBJECT AHEAD OF A VEHICLE AND CONTROLLING THE VEHICLE IN RESPONSE TO THE DETECTED OBJECT

BACKGROUND OF THE INVENTION

1. Field of the Invention

The present invention relates to a vehicle control system for detecting an object ahead of a vehicle by an object detector mounted on the vehicle and controlling the vehicle based on the detection result.

2. Description of the Related Art

Japanese Patent Application Laid-open No. 5-174296 discloses an inter-vehicle distance detection and warning system in which the distance between an own vehicle and a preceding vehicle is detected by a radar device and a warning is issued to a driver when the inter-vehicle distance becomes a predetermined value or less, to thereby prevent collision. A detection area of the radar device is changed according to change in the speed of the own vehicle.

In the above-mentioned conventional arrangement, the detection area of the radar device is changed according to the vehicle speed but, even when the vehicle speed is the same, the possibility of collision differs between a case where the driver has noticed the inter-vehicle distance decreasing to have an intention of decelerating and the other cases. Therefore, it is not appropriate to change the detection area according to the vehicle speed alone without taking into consideration the driver's intention.

Further, the detection area is generally set to be along the travel locus of the subject vehicle and substantially as wide as a lane so that the radar device detects a preceding vehicle. However, when there is an intersection, etc. in front of the own vehicle, the driver must also pay attention to any vehicles cutting in from the side into the travel locus of the own vehicle. Therefore, in detection of a preceding vehicle based on a narrow detection area substantially having the lane width, there might be a gap between the detection and the driver's consciousness. Immoderate widening of the detection area is undesirable in solving this problem, because a vehicle in the opposite lane might be erroneously detected, or the data processing load of the object detection system might increase.

SUMMARY OF THE INVENTION

The present invention has been achieved in view of the above circumstances, and has an object to reliably detect an obstacle by properly setting a control object determination condition for determining a control object in order to control the travel of an own vehicle, thereby performing an appropriate vehicle control based on the detection result.

In order to attain the above-described object, according to a first feature of the present invention, there is proposed a vehicle control system comprising: an object detector for detecting an object ahead of an own vehicle; a locus estimator for estimating a travel locus of the own vehicle; a control object determinator for determining a control object in order to control travel of the own vehicle based on outputs of the object detector and the locus estimator, and a predetermined control object determination condition; and a vehicle controller for performing a vehicle control of the own vehicle based on an output of the control object determinator, wherein the vehicle control system further comprises a decleration intention detector for detecting a deceleration intention of an occupant, wherein the control object determinator changes the control object determination condition based on a detection result of the deceleration intention detector, and wherein the vehicle controller changes a vehicle control content of the own vehicle when there is an object which is newly determined as a control object based on the changed control object determination condition.

According to a second feature of the invention, in addition to the first feature, when a tracking travel control is being performed with respect to a preceding vehicle determined by the control object determinator, if deceleration intention of the occupant is detected by the deceleration intention detector, the control object determinator enlarges a detection area for determining the control object, and if a new control object exists in the enlarged detection area and the own vehicle is under an acceleration control, the vehicle controller performs a control of any one of stopping the acceleration control, decreasing acceleration gain and increasing an inter-vehicle distance from the control object.

According to a third feature of the invention, in addition to the first feature, when a tracking travel control is being performed with respect to a preceding vehicle determined by the control object determinator, if deceleration intention of the occupant is detected by the deceleration intention detector, the control object determinator enlarges a detection area for determining the control object, and if a new control object exists in the enlarged detection area and the own vehicle is under a constant speed control, the vehicle controller performs a control of any one of delaying acceleration start timing, increasing an inter-vehicle distance from the control object and decreasing a constant speed travel set vehicle speed.

According to a fourth feature of the invention, in addition to the first feature, when a tracking travel control is being performed with respect to a preceding vehicle determined by the control object determinator, if deceleration intention of the occupant is detected by the deceleration intention detector, the control object determinator enlarges a detection area for determining the control object, and if a new control object exists in the enlarged detection area and the own vehicle is under a deceleration control, the vehicle controller performs a control of any one of increasing deceleration gain, increasing an inter-vehicle distance from the control object and decreasing a constant speed travel set vehicle speed.

According to a fifth feature of the invention, in addition to the first feature, when the control object is not determined by the control object determinator, if deceleration intention of the occupant is detected by the deceleration intention detector, the control object determinator enlarges a detection area for determining the control object, and if a new control object exists in an enlarged detection area, and the own vehicle is under an acceleration control, the vehicle controller performs a control of any one of stopping the acceleration control and decreasing acceleration gain.

According to a sixth feature of the invention, in addition to the first feature, when the control object is not determined by the control object determinator, if deceleration intention of the occupant is detected by the deceleration intention detector, the control object determinator enlarges a detection area for determining the control object, and if a new control object exists in an enlarged detection area, and the own vehicle is under a constant speed control, the vehicle controller performs a control of any one of delaying acceleration start timing and decreasing a constant speed travel set vehicle speed.

A radar device 15 in an embodiment corresponds to the object detector of the present invention.

According to the first feature, when the deceleration intention detector detects that the occupant has apprehension about the condition ahead of his own car and attempts to decelerate the own vehicle, the control object determinator changes the control object determination condition. Therefore, a new control object such as a cutting-in vehicle can be detected more reliably in accordance with the increase in the amount of attention which the occupant pays to the condition ahead of the own vehicle. As a result, the vehicle controller changes the vehicle control content of the own vehicle, thereby performing an appropriate vehicle control for the newly detected control object to eliminate the sense of discomfort of the occupant.

According to the second feature, if the deceleration intention of the occupant is detected when the tracking travel control is being performed with respect to the preceding vehicle, the detection area is enlarged, and if a new control object exists in the detection area and the own vehicle is under the acceleration control, the vehicle controller performs a control of any one of stopping the acceleration control, decreasing acceleration gain and increasing the inter-vehicle distance from the control object. Therefore, acceleration of the own vehicle is suppressed, or the inter-vehicle distance between the own vehicle and the control object is secured, thereby eliminating a sense of discomfort of the occupant.

According to the third feature, if the deceleration intention of the occupant is detected when the tracking travel control is being performed with respect to the preceding vehicle, the detection area is enlarged, and if a new control object exists in the detection area and the own vehicle is under the constant speed control, the vehicle controller performs a control of any one of delaying the acceleration start timing, increasing the inter-vehicle distance from the control object and decreasing the constant speed travel set vehicle speed. Therefore, acceleration of the own vehicle is suppressed and deceleration is quickly carried out, or the inter-vehicle distance between the own vehicle and the control object is secured, thereby eliminating a sense of discomfort of the occupant.

According to the fourth feature, if the deceleration intention of the occupant is detected when the tracking travel control is being performed with respect to the preceding vehicle, the detection area is enlarged, and if a new control object exists in the detection area and the own vehicle is under the deceleration control, the vehicle controller performs a control of any one of increasing deceleration gain, increasing the inter-vehicle distance from the control object and decreasing the constant speed travel set vehicle speed. Therefore, the own vehicle can be quickly decelerated, or the inter-vehicle distance between the own vehicle and the control object is secured, thereby eliminating a sense of discomfort of the occupant.

According to the fifth feature, if the deceleration intention of the occupant is detected when the constant speed travel control is performed without the presence of a preceding vehicle, the detection area is enlarged, and if a new control object exists in the detection area and the own vehicle is under the acceleration control, the vehicle controller performs a control of any one of stopping the acceleration control and decreasing acceleration gain. Therefore, acceleration of the own vehicle is suppressed, and a sense of discomfort of the occupant is eliminated.

According to the sixth feature, if the deceleration intention of the occupant is detected when the constant speed travel control is performed without the presence of a preceding vehicle, the detection area is enlarged, and if a new control object exists in the detection area and the own vehicle is under the constant speed control, the vehicle controller performs a control of any one of delaying the acceleration start timing and decreasing the constant speed travel set vehicle speed. Therefore, acceleration of the own vehicle is suppressed, or the own vehicle is decelerated, and thus a sense of discomfort of the occupant can be eliminated.

The above-described object and the other objects, the characteristics and the advantages of the present invention will become apparent from the description of preferred embodiments that will be described in detail below with reference to the accompanying drawings.

BRIEF DESCRIPTION OF THE DRAWINGS

FIG. 2 is an explanatory view of a detection area.

FIG. 3 is a first partial diagram of a flow chart explaining an operation when a driver has a deceleration intention.

FIG. 4 is a second partial diagram of a flow chart explaining the operation when the driver has the deceleration intention.

FIG. 5 is a third partial diagram of a flow chart explaining the operation when the driver has the deceleration intention.

DETAILED DESCRIPTION OF THE PREFERRED EMBODIMENT

Figure 1:
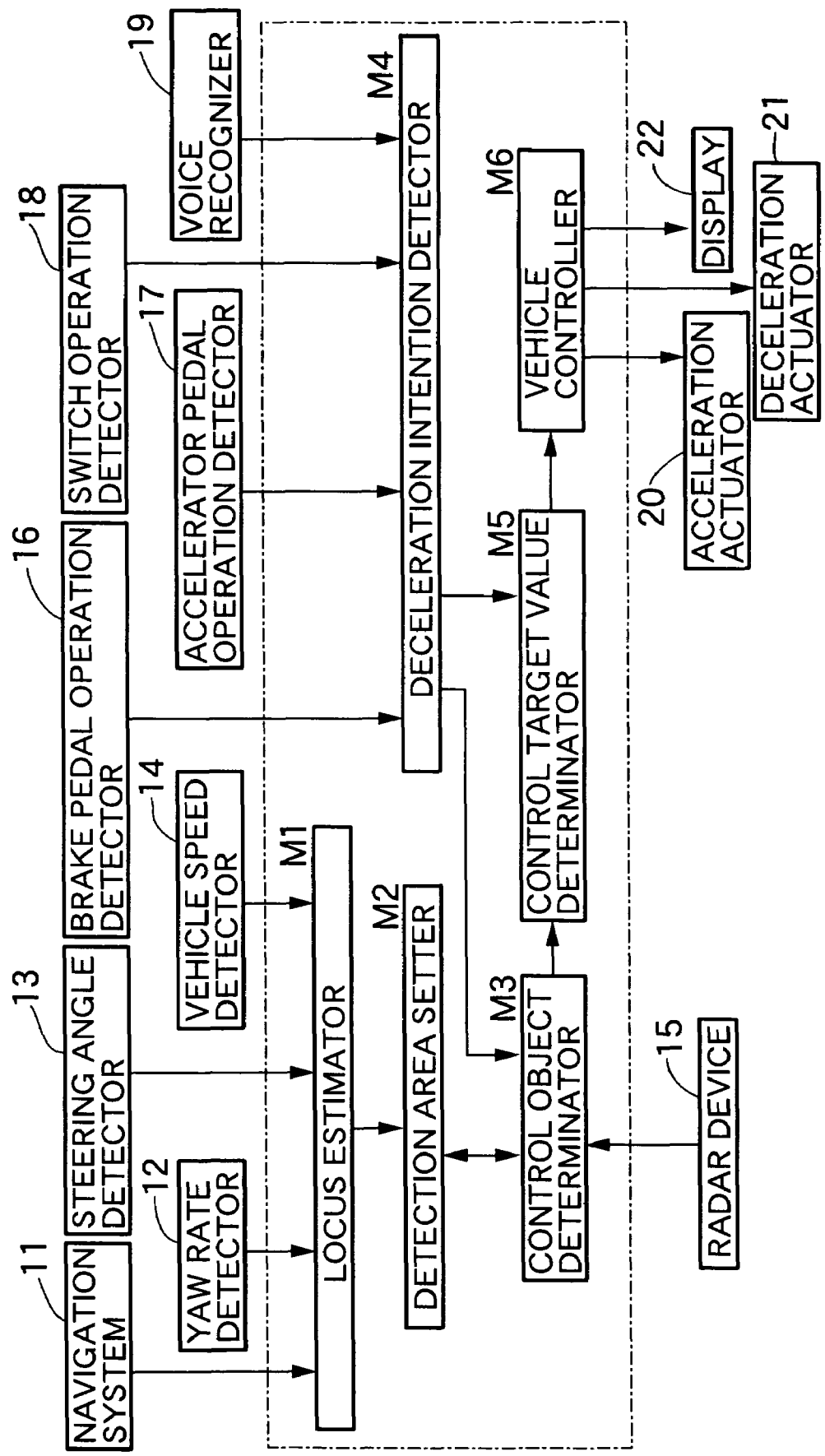
FIG. 1 is a block diagram of a control system of an ACC system according to a first embodiment.

As shown in FIG. 1, an ACC (Adaptive Cruise Control) system, which performs tracking travel by following a preceding vehicle while keeping a previously set inter-vehicle distance when the preceding vehicle exists, and performs constant speed travel at a previously set vehicle speed when the preceding vehicle does not exist. The ACC system includes a locus estimator M1, a detection area setter M2, a control object determinator M3, a deceleration intention detector M4, a control target value determinator M5 and a vehicle controller M6. A navigation system 11, a yaw rate detector 12, a steering angle detector 13 and a vehicle speed detector 14 are connected to the locus estimator M1. A radar device 15 is connected to the control object determinator M3. A brake pedal operation detector 16, an accelerator pedal operation detector 17, a switch operation detector 18 and a voice recognizer 19 are connected to the deceleration intention detector M4. An acceleration actuator 20, a deceleration actuator 21 and a display 22 are connected to the vehicle controller M6.

The locus estimator M1 estimates a future travel locus of the own vehicle based on road information stored in the navigation system 11, a yaw rate detected in the yaw rate detector 12, a steering angle detected in the steering angle detector 13 and a vehicle speed detected in the vehicle speed detector 14.

The deceleration intention detector M4 determines whether or not the driver has an intention of decelerating the own vehicle. Namely, when the brake pedal operation detector 16 detects a depressing operation of a brake pedal, when the accelerator pedal operation detector 17 detects a returning operation of an accelerator pedal, or when the switch operation detector 18 detects the operation in the decelerating direction of a vehicle speed setting switch to instruct the set vehicle speed of the constant speed travel of the ACC system or a resume switch to increase and decrease the set vehicle speed, the deceleration intension detector M4 determines that the driver has a deceleration intention. The voice recognizer 19 determines the presence or absence of the deceleration intention from the content of the conversation between the occupants and the content of driver's talking to himself.

As shown in FIG. 2A, the detection area setter M2 sets a detection area by setting a future travel locus of the own vehicle estimated in the locus estimator M1 as a center line, and adding a predetermined width along the center line. The width of the detection area is normally set equally to the lane width, but when the deceleration intention detector M4 detects the deceleration intention of the driver, the width and length of the detection area are increased as shown in FIG. 2B. The increase amounts of the width and length of the detection area are optional.

The radar 15 transmits an electromagnetic wave such as laser light and a millimeter wave, and receives the reflected wave, which is the electromagnetic wave reflected from an object, thereby detecting the direction of the object, the distance to the object, a relative speed to the object and the like. The control object determinator M3 determines an object existing in the detection area among the objects detected by the radar device 15, as a preceding vehicle which is a control object.

The control target value determinator M5 sets the preceding vehicle determined in the control object determinator M3 as a control object; determines a target vehicle speed, target acceleration and deceleration speeds, a target inter-vehicle distance and the like, which are parameters to make the own vehicle perform tracking travel following the preceding vehicle; and corrects the target vehicle speed, the target acceleration and deceleration speeds, the target inter-vehicle distance and the like in accordance with the deceleration intention of the driver which is detected in the deceleration intention detector M4.

The vehicle controller M6 performs the tracking travel control and the constant speed travel control by driving the acceleration actuator 20 and the deceleration actuator 21, opening and closing the throttle valve, and operating the braking device, based on the control target values determined in the control target value determinator M5; and displays the present control state of the vehicle on the display 22 to inform the driver of the control state.

The operation will be further described based on a flow chart in FIG. 3 to FIG. 5.

The flow chart in FIG. 3 to FIG. 5 shows the case where the deceleration intention detector M4 detects the deceleration intention of the driver. First, an object is detected by the radar device 15 in step S1, the travel locus of the own vehicle is estimated by the locus estimator M1 in step S2, and a first detection area, namely, the detection area corresponding to the lane width along the estimated travel locus is set by the detection area setter M2 in step S3. When a first obstacle exists in the first detection area in the subsequent step S4, the control object determinator M3 sets the first obstacle as the control object in step S5, and the vehicle controller M6 controls the vehicle speed so that the own vehicle performs tracking travel while keeping the previously set inter-vehicle distance with respect to the first obstacle, in step S6. On the other hand, when the first obstacle does not exist in the first detection area in the step S4, the vehicle controller M6 controls the vehicle speed so that the own vehicle performs constant speed travel at the previously set vehicle speed in step S7.

When the deceleration intention detector M4 detects the deceleration intention of the driver in step S8 during the tracking travel control in the step S6, the detection area setter M2 sets a second detection area by a command from the control object determinator M3 in step S9. As shown in FIG. 2, the second detection area is set to have a larger width than the first detection area so that a cutting-in vehicle or the like which cuts in the detection area from the side can be detected, and also set to have a larger distance than the first detection area so that a preceding vehicle ahead of the immediately preceding vehicle can be detected. A second obstacle is newly detected in the second detection area in the subsequent step S10, and if the second obstacle is at the position near the travel locus of the own vehicle in step S11, or if the second obstacle is approaching the travel locus of the own vehicle in step S12 even though the second obstacle is at the position far from the travel locus of the own vehicle in the step S11, the vehicle controller M6 changes the content of the vehicle control of the own vehicle in accordance with the urgency in order to avoid the contact with the second obstacle in the following steps S13 to S17.

Namely, when the own vehicle is under acceleration control in step S13, the vehicle controller M6 stops the acceleration control of the own vehicle, or decreases the acceleration gain, or increases the set inter-vehicle distance of the tracking travel control in step S15. When the own vehicle is under the constant speed control in step S14, the vehicle controller M6 delays the acceleration start timing of the own vehicle, or increases the set inter-vehicle distance of the tracking travel control, or decreases the set vehicle speed of the constant speed travel control in step S16. When the own vehicle is under the deceleration control in step S14, the vehicle controller M6 increases the set inter-vehicle distance of the tracking travel control, or increases the deceleration gain, or decreases the set vehicle speed of the constant speed travel control in step S17.

When the deceleration intention detector M4 detects the deceleration intention of the driver in step S8' during the constant speed travel control in the step S7, the detection area setter M2 enlarges the second detection area as described above by the command from the control object determinator M3 in step S9'. A first obstacle is newly detected in the second detection area in the subsequent step S10', and if the first obstacle is at the position near the travel locus of the own vehicle in step S11', or if the first obstacle is approaching the travel locus of the own vehicle in step S12' even though the first obstacle is at the position far from the travel locus of the own vehicle in the step S11', the content of the vehicle control of the own vehicle by the vehicle controller M6 is changed in accordance with the urgency in order to avoid the contact with the first obstacle in the following steps S13' to S16'.

Namely, when the own vehicle is under the acceleration control in step S13', the acceleration control of the own vehicle is stopped, or the acceleration gain is decreased in step S15'. When the own vehicle is under the constant speed control in step S14', the acceleration start timing of the own vehicle is delayed, or the set vehicle speed of the constant speed travel control is decreased in step S16'. The deceleration control is not basically performed during the constant speed travel control when the preceding vehicle does not exist, and therefore when the answer of the step S14' is NO, no processing is performed.

As described above, when the driver has apprehension about the circumstances ahead of the own vehicle to have a deceleration intention, the detection area in which the obstacle is detected is enlarged. Therefore, the sense of discomfort of the driver is eliminated by reliably detecting the cutting-in vehicle or the like which cuts in a space in front of the own vehicle, to prevent the own vehicle from contacting the cutting-in vehicle, so that the operation of the ACC system can be ensured. When a new preceding vehicle is detected as the detection area is enlarged, an optimal vehicle control for avoiding contact with the preceding vehicle can be selected and executed in accordance with the condition of the own vehicle at that time, namely, in accordance with whether the own vehicle is under the tracking travel control, or under the constant speed travel control, or under the acceleration control, or under the constant speed control or under the deceleration control.

For example, in the conventional control, when the driver finds a cutting-in vehicle which is cutting in between the own vehicle and the preceding vehicle to have a deceleration intention during the tracking travel control for the preceding vehicle as the first obstacle, so that the detection area is enlarged and the cutting-in vehicle is detected as a second obstacle, the deceleration control of the own vehicle is performed when the cutting-in vehicle completely cuts in a place in front of the own vehicle. On the other hand, according to this embodiment, the deceleration control of the own vehicle can be performed before the cutting-in vehicle completely cuts in a place in front of the own vehicle, to thereby perform a vehicle control reflecting the driver's deceleration intention without giving a sense of discomfort to the driver.

In the conventional control, when the driver finds a traffic jam ahead of the preceding vehicle to have a deceleration intention during the tracking travel control for the preceding vehicle as the first obstacle, so that the detection area is enlarged and a preceding vehicle (second preceding vehicle) ahead of the preceding vehicle (first preceding vehicle) is newly detected as a second obstacle, the deceleration control is performed when the first preceding vehicle decelerates in response to the deceleration of the second preceding vehicle ahead of the first preceding vehicle. On the other hand, according to this embodiment, the deceleration control of the own vehicle can be immediately performed when the second preceding vehicle ahead of the first preceding vehicle decelerates, to thereby perform a vehicle control reflecting the driver's deceleration intention without giving a sense of discomfort to the driver.

Detection of the deceleration intention of the driver is performed based on the operation of the brake pedal, the operation of the accelerator pedal, the operation of the switch or the voice of the occupants, and therefore the detection can be easily and reliably performed.

The embodiment of the present invention has been described above, but various design changes can be made within the subject matter of the present invention.

For example, the detection area is uniformly enlarged when the driver's deceleration intension is detected in the embodiment, but the detection area may be divided into a first area extending from the own vehicle to the preceding vehicle, and a second area extending from the preceding vehicle to the maximum detectable distance of the radar device 15, and at least only one of them may be enlarged. Which one of the first and second areas is enlarged may be set in accordance with various conditions.

Citing several examples, the area including an intersection or junction, which has high possibility of existence of cutting-in vehicles, may be preferentially enlarged, or only the second area may be enlarged when there is less possibility that another vehicle cuts in the first area because the inter-vehicle distance between one's own vehicle and the preceding vehicle is small, or only the first area may be enlarged when there is no danger even if another vehicle cuts in the second area because the inter-vehicle distance between the own vehicle and the preceding vehicle is large.

As described above, by enlarging only a part of the detection area, the problem of erroneously detecting a vehicle on the opposite lane as a preceding vehicle or the problem of increase in the data processing load on the radar device 15 can be minimized.

The ACC system has been described in the embodiment, but the present invention is applicable to any vehicle control system not for an ACC system.

What is claimed is:

1. A control system for use in a vehicle, comprising:
    deceleration intention detecting means for detecting a deceleration intention of a driver of the vehicle;
    object detecting means for detecting an object ahead of the vehicle;
    travel locus estimating means for estimating a travel locus of the vehicle;
    control object determining means for determining whether a detected object within an estimated travel locus should be designated as a control object in accordance with a predetermined control object determination condition, and wherein the control object determining means changes the control object determination condition responsive to the deceleration intention detecting means; and
    vehicle controlling means for controlling the vehicle in accordance with one of a constant speed mode and a vehicle following mode in which the vehicle maintains a designated inter-vehicle distance with respect to a designated control object, the vehicle controlling means altering control of the vehicle when a new object is determined by the control object determining means as the control object based on the changed control object determination condition.

2. The vehicle control system according to claim 1, wherein if deceleration intention of the driver is detected by the deceleration intention detecting means, the control object determining means enlarges a detection area for determining the control object.

3. The vehicle control system according to claim 2, wherein the vehicle controlling means is controlling the vehicle in accordance with the constant speed mode, and if a new control object is detected in the enlarged detection area, the vehicle controlling means performs at least one of stopping the constant speed mode, decreasing speed, and increasing an inter-vehicle distance from the control object.

4. The vehicle control system according to claim 2, wherein the vehicle controlling means is controlling the vehicle in accordance with the vehicle following mode with respect to a preceding vehicle determined by the control object determining means as the designated control object, if a new control object is detected in the enlarged detection area and the vehicle controlling means is controlling the vehicle at a constant speed, the vehicle controlling means performs at least one of delaying acceleration start timing, increasing an inter-vehicle distance from the control object, and decreasing a constant speed travel set vehicle speed.

5. The vehicle control system according to claim 2, wherein the vehicle controlling means is controlling the vehicle in accordance with the vehicle following mode with respect to a preceding vehicle determined by the control object determining means as the designated control object, if a new control object is detected in the enlarged detection area and the vehicle controlling means is decelerating the vehicle, the vehicle controlling means performs at least one of increasing deceleration gain, increasing an inter-vehicle distance from the control object, and decreasing a constant speed travel set vehicle speed.

6. The vehicle control system according to claim 1, wherein the control object determining means has not determined a control object, if deceleration intention of the driver is detected by the deceleration intention detecting means, the control object determining means enlarges a detection area for determining the control object, and if a new control object is detected in an enlarged detection area, and the vehicle controlling means is accelerating the vehicle in accordance with the constant speed mode, the vehicle controlling means performs at least one of stopping the constant speed mode and decreasing acceleration gain.

7. A control system for use in a vehicle, comprising:
a deceleration intention detector adapted to detect a deceleration intention of a driver of the vehicle;
an object detector adapted to detect an object ahead of the vehicle;
a locus estimator adapted to estimate a travel locus of the vehicle;
a control object determinator operatively coupled to the deceleration intention detector, the object detector, and the locus estimator, and adapted to determine whether a detected object within an estimated travel locus should be designated as a control object in accordance with a predetermined control object determination condition, and wherein the control object determinator changes the control object determination condition responsive to the deceleration intention detector; and
a vehicle controller operatively coupled to the control object determinator, and being adapted to control the vehicle in accordance with one of a constant speed mode and a vehicle following mode in which the vehicle maintains a designated inter-vehicle distance with respect to a designated control object, the vehicle controller altering control of the vehicle when a new object is determined by the control object determinator as the control object based on the changed control object determination condition.

8. The vehicle control system according to claim 7, wherein if deceleration intention of the driver is detected by the deceleration intention detector, the control object determinator enlarges a detection area for determining the control object.

9. The vehicle control system according to claim 8, wherein the vehicle controller is controlling the vehicle in accordance with the constant speed mode, and if a new control object is detected in the enlarged detection area, the vehicle controller performs at least one of stopping the constant speed mode, decreasing speed, and increasing an inter-vehicle distance from the control object.

10. The vehicle control system according to claim 8, wherein the vehicle controller is controlling the vehicle in accordance with the vehicle following mode with respect to a preceding vehicle determined by the control object determinator as the designated control object, if a new control object is detected in the enlarged detection area and the vehicle controller is controlling the vehicle at a constant speed, the vehicle controller performs at least one of delaying acceleration start timing, increasing an inter-vehicle distance from the control object, and decreasing a constant speed travel set vehicle speed.

11. The vehicle control system according to claim 8, wherein the vehicle controller is controlling the vehicle in accordance with the vehicle following mode with respect to a preceding vehicle determined by the control object determinator as the designated control object, if a new control object is detected in the enlarged detection area and the vehicle controller is decelerating the vehicle, the vehicle controller performs at least one of increasing deceleration gain, increasing an inter-vehicle distance from the control object, and decreasing a constant speed travel set vehicle speed.

12. The vehicle control system according to claim 7, wherein the control object determinator has not determined a control object, if deceleration intention of the driver is detected by the deceleration intention detector, the control object determinator enlarges a detection area for determining the control object, and if a new control object is detected in an enlarged detection area, and the vehicle controller is accelerating the vehicle in accordance with the constant speed mode, the vehicle controller performs at least one of stopping the constant speed mode and decreasing acceleration gain.

13. The vehicle control system according to claim 7, wherein the control object determinator has not determined a control object, if deceleration intention of the driver is detected by the deceleration intention detector, the control object determinator enlarges a detection area for determining the control object, and if a new control object is detected in an enlarged detection area, and the vehicle controller is operating the vehicle in accordance with the constant speed mode, the vehicle controller performs at least one of delaying acceleration start timing and decreasing a constant speed travel set vehicle speed.

14. A method for controlling a vehicle, comprising:
detecting a deceleration intention of a driver of the vehicle;
detecting an object ahead of the vehicle;
estimating a travel locus of the vehicle;
determining whether a detected object within an estimated travel locus should be designated as a control object in accordance with a predetermined control object determination condition, and changing the control object determination condition responsive to a detected deceleration intention; and
controlling the vehicle in accordance with one of a constant speed mode and a vehicle following mode in which the vehicle maintains a designated inter-vehicle distance with respect to a designated control object, including altering control of the vehicle when a new object is determined as the control object based on the changed control object determination condition.

15. The method for controlling a vehicle according to claim 14, wherein if a deceleration intention of the driver is detected, enlarging a detection area for determining the control object.

16. The method for controlling a vehicle according to claim 15, wherein the controlling step comprises controlling the vehicle in accordance with the constant speed mode, and if a new control object is detected in the enlarged detection area, the controlling step further comprises stopping the constant speed mode, decreasing speed, and increasing an inter-vehicle distance from the control object.

17. The method for controlling a vehicle according to claim 15, wherein controlling step comprises controlling the vehicle in accordance with the vehicle following mode with respect to a preceding vehicle determined as the designated control object, if a new control object is detected in the enlarged detection area and the controller step comprises controlling the vehicle at a constant speed, the controlling step further comprises at least one of delaying acceleration start timing, increasing an inter-vehicle distance from the control object, and decreasing a constant speed travel set vehicle speed.

18. The method for controlling a vehicle according to claim 15, wherein controlling step comprises controlling the vehicle in accordance with the vehicle following mode with respect to a preceding vehicle determined as the designated control object, if a new control object is detected in the enlarged detection area and the controlling step comprises decelerating the vehicle, the controlling step further comprises at least one of increasing deceleration gain, increasing an inter-vehicle distance from the control object, and decreasing a constant speed travel set vehicle speed.

19. The method for controlling a vehicle according to claim 14, wherein the control object determining step has not yet determined a control object, if deceleration intention of the driver is detected, enlarging a detection area for determining the control object, and if a new control object is detected in an enlarged detection area, and the controlling step comprises accelerating the vehicle in accordance with the constant speed mode, the controlling step further comprises performing at least one of stopping the constant speed mode and decreasing acceleration gain.

20. The method for controlling a vehicle according to claim 14, wherein the control object determining step has not yet determined a control object, if deceleration intention of the driver is detected, enlarging a detection area for determining the control object, and if a new control object is detected in an enlarged detection area, and the controlling step comprises operating the vehicle in accordance with the constant speed mode, the controlling step further comprises performing at least one of delaying acceleration start timing and decreasing a constant speed travel set vehicle speed.

21. The vehicle control system according to claim 1, wherein the control object determining means has not determined a control object, if deceleration intention of the driver is detected by the deceleration intention detecting means, the control object determining means enlarges a detection area for determining the control object, and if a new control object is detected in an enlarged detection area, and the vehicle controlling means is operating the vehicle in accordance with the constant speed mode, the vehicle controlling means performs at least one of delaying acceleration start timing and decreasing a constant speed travel set vehicle speed.

* * * * *